(12) United States Patent
Fang et al.

(10) Patent No.: US 8,732,807 B2
(45) Date of Patent: May 20, 2014

(54) METHOD AND SYSTEM USING A CYBER ID TO PROVIDE SECURE TRANSACTIONS

(75) Inventors: Yang Lit Fang, Singapore (SG); Ryan Nacion Trinidad, Cebu (PH)

(73) Assignee: Medium Access Systems Private Ltd., Singapore (SG)

( * ) Notice: Subject to any disclaimer, the term of this patent is extended or adjusted under 35 U.S.C. 154(b) by 165 days.

(21) Appl. No.: 13/442,019

(22) Filed: Apr. 9, 2012

(65) Prior Publication Data
US 2013/0269009 A1    Oct. 10, 2013

(51) Int. Cl.
*G06F 21/00*    (2013.01)

(52) U.S. Cl.
USPC ................................... 726/6; 726/4; 713/169

(58) Field of Classification Search
CPC ....... G06F 21/31; G06F 21/44; G06F 21/445; H04L 63/0815
See application file for complete search history.

(56) References Cited

U.S. PATENT DOCUMENTS

| | | | |
|---|---|---|---|
| 7,024,377 B1 | 4/2006 | Goldshmidt et al. | |
| 7,043,635 B1 | 5/2006 | Keech | |
| 7,392,388 B2 | 6/2008 | Keech | |
| 2002/0029342 A1 | 3/2002 | Keech | |
| 2002/0059146 A1* | 5/2002 | Keech | 705/64 |
| 2003/0074317 A1 | 4/2003 | Hofi | |
| 2004/0078342 A1 | 4/2004 | Goldshmidt et al. | |
| 2005/0256806 A1* | 11/2005 | Tien et al. | 705/64 |
| 2006/0095369 A1 | 5/2006 | Hofi | |
| 2007/0260555 A1* | 11/2007 | Ho et al. | 705/75 |
| 2009/0132381 A1* | 5/2009 | Gangi | 705/18 |

FOREIGN PATENT DOCUMENTS

| | | |
|---|---|---|
| AU | 8784701 A | 3/2002 |
| AU | 200187847 A1 | 3/2002 |
| AU | 2001287847 A8 | 3/2002 |
| AU | 2002334371 A8 | 5/2003 |
| AU | 2005100466 A4 | 7/2005 |
| AU | 2003200600 B2 | 4/2007 |
| BR | 01138877 A | 7/2003 |
| CA | 2421495 A1 | 3/2002 |
| CN | 1561508 A | 1/2005 |
| CN | 1561508 | 10/2006 |
| DK | 1316076 T3 | 5/2013 |
| EA | 004422 B1 | 4/2004 |
| EP | 1316076 B1 | 3/2003 |
| EP | 1316076 A2 | 6/2003 |
| ES | 2403039 T3 | 5/2013 |
| GB | 2366966 A | 3/2002 |

(Continued)

*Primary Examiner* — Fikremariam A Yalew
*Assistant Examiner* — Kendall Dolly
(74) *Attorney, Agent, or Firm* — James R. Klaiber; Pryor Cashman LLP

(57) ABSTRACT

A method and system for securing a user transaction involving a subscriber unit ("SU") (having a processor, memory, and a display configured to accept user input), a credential information manager ("CIM") (having a processor and memory), and a transaction service provider ("TSP") (having a processor and memory). A cyber identifier ("CyberID"), a subscriber identifier ("SubscriberID"), and subscriber information, each associated with the user, is stored in the CIM. A transaction request is sent from the SU to the TSP, which creates a transaction identifier ("TID"), stores it in the TSP memory and transmits it to the SU. The SU transmits an authentication request, the TID, and SubscriberID to the CIM, which authenticates the SubscriberID and verifies the TID to the TSP. The TSP verifies the TID and reports it to the CIM, which transmits the CyberID and subscriber information to the TSP, and transmits a transaction authorization to the SU.

35 Claims, 12 Drawing Sheets

(56) References Cited

FOREIGN PATENT DOCUMENTS

| | | | |
|---|---|---|---|
| JP | 2004508644 A | 3/2004 |
| KR | 1020030036766 A | 5/2003 |
| MX | PA03002050 A | 12/2004 |
| NO | 20030982 | 3/2003 |
| NO | 20030982 A | 5/2003 |
| NZ | 524391 A | 9/2004 |
| PT | 1316076 E | 5/2013 |
| WO | 0221463 A2 | 3/2002 |
| WO | 0221463 A3 | 1/2003 |
| WO | 03012755 A1 | 2/2003 |
| WO | 03043252 A2 | 5/2003 |
| WO | 03043252 A3 | 11/2003 |
| WO | 2005114899 A2 | 12/2005 |
| WO | 2005114899 A3 | 12/2006 |
| WO | 2007018820 A2 | 2/2007 |
| WO | 2007018820 A3 | 3/2007 |
| WO | 2007072480 A2 | 6/2007 |
| WO | 2007072480 A3 | 5/2011 |
| WO | PCT/IB2013/000634 | 4/2013 |

* cited by examiner

METHOD AND SYSTEM USING A CYBER ID TO PROVIDE SECURE TRANSACTIONS

FIELD OF THE INVENTION

The present invention discloses to a new process for protecting a user's identification and confidential information during online transactions. The new process creates and utilizes a third-party intermediary between the user and the service provider which prevents a hacker's ability to gain access to the user's information by not only authorizing each specific transaction but also validating the identification of the user as well as the credibility of the service provider.

BACKGROUND OF THE INVENTION AND DISCLOSURE

Online security is essential for a provider when rendering a service to any subscriber. As a common security feature, a subscriber login authentication is often required in order for a subscriber to access these services. Normally the provider will ask the subscriber for a username and login password to authenticate the user in future transactions, and the subscriber must input this information before gaining access to the services requested.

Common security issues are found during the process of logging in or keying in a user's credentials, such as his username and password. In order for a subscriber to log on to any service, the username and login password are requested is in one process, usually one right after the other. If the security protecting this login process is compromised, a hacker can get into the user's account because the username and login password are inputted simultaneously, thus providing access to both. In the alternative to when a hacker accesses a user's account by "stealing" their username and password, a security breach is also possible when a hacker either imitates the service provider or steals credential information directly from the service provider. When this happens, the provider's services can be illegally duplicated by a bogus site. Once the subscriber's username and password are inputted into a phony site, a hacker is able to steal subscriber credentials through phishing, and in turn access any information connected to that username. Hackers can also compromise the security of online services by accessing the information stored in the subscriber unit (hereinafter "SU") whenever a subscriber uses the "auto login feature." All of these scenarios present issues that require a secure method of user login to prevent theft of authentication information, either from the subscriber or the service provider.

The present invention discloses a new method for protecting confidential information during online transactions which aims to solve all the aforementioned dilemmas. The process utilizes an intermediary, called a Credential Information Manager ("CIM"), which transmits confidential information between a subscriber and internet service provider. The CIM provides a CyberID to the service provider which authorizes the transaction. It uses both a transaction ID, provided by the service provider to represent that single transaction, and confidential security information, provided by the subscriber for validation of his identity. This process occurs automatically upon the subscriber's attempt to enter into a transaction with the service provider, based on a pre-existing agreement between the service provider and the CIM. The present invention serves two functions: it certifies the validity of both parties to the transaction to ensure that neither the subscriber nor the service provider are fraudulent, and it also provides an added level of security to prevent hackers from gaining access to a user's login information and thus their accounts. The present invention creates an additional step which causes difficulty for a hacker to access since the transfer of information is being sent in a triangular fashion rather than back and forth between only two entities.

SUMMARY OF THE INVENTION

A method and system for securing a transaction by a user involving a subscriber unit ("SU") (having a processor, a memory, and a display and configured to accept user input), a credential information manager ("CIM") (having a processor and a memory), and a transaction service provider ("TSP") (having a processor and a memory). A cyber identifier ("CyberID"), a subscriber identifier ("SubscriberID"), and subscriber information, each associated with the user, is stored in the CIM memory. A request for a transaction is sent from the SU to the TSP, which creates a transaction identifier ("TID"), stores the TID in the TSP memory, and transmits the TID to the SU. The SU transmits an authentication request along with the TID and a SubscriberID to the CIM. The CIM authenticates the received SubscriberID with the SubscriberID in its memory, and transmits verification request along with the TID received from the SU to the TSP. The TSP verifies the received TID with the TID in its memory and reports the result of the verification to the CIM. The CIM transmits the CyberID and the subscriber information to the TSP, and transmits a transaction authorization to the SU.

DETAILED DESCRIPTION OF THE DRAWINGS AND THE PREFERRED EMBODIMENT

Description will now be given of the invention with reference to the attached FIGS. 1-12. It should be understood that these figures are exemplary in nature and in no way serve to limit the scope of the invention as the invention will be defined by claims, and the scope of the invention will be the scope of the claims, as interpreted by the Courts.

The present invention discloses a new method for protecting confidential information during online transactions which aims to solve all the aforementioned dilemmas. The process utilizes an intermediary, called a Credential Information Manager ("CIM"), which transmits confidential information between a subscriber and internet service provider. The CIM provides a CyberID to the service provider which authorizes the transaction. It uses both a transaction ID, provided by the service provider to represent that single transaction, and confidential security information, provided by the subscriber for validation of his identity. This process occurs automatically upon the subscriber's attempt to enter into a transaction with the service provider, based on a pre-existing agreement between the service provider and the CIM. The present invention serves two functions: it certifies the validity of both parties to the transaction to ensure that neither the subscriber nor the service provider are fraudulent, and it also provides an added level of security to prevent hackers from gaining access to a user's login information and thus their accounts. The present invention creates an additional step which causes difficulty for a hacker to access since the transfer of information is being sent in a triangular fashion rather than back and forth between only two entities.

Figure 1:
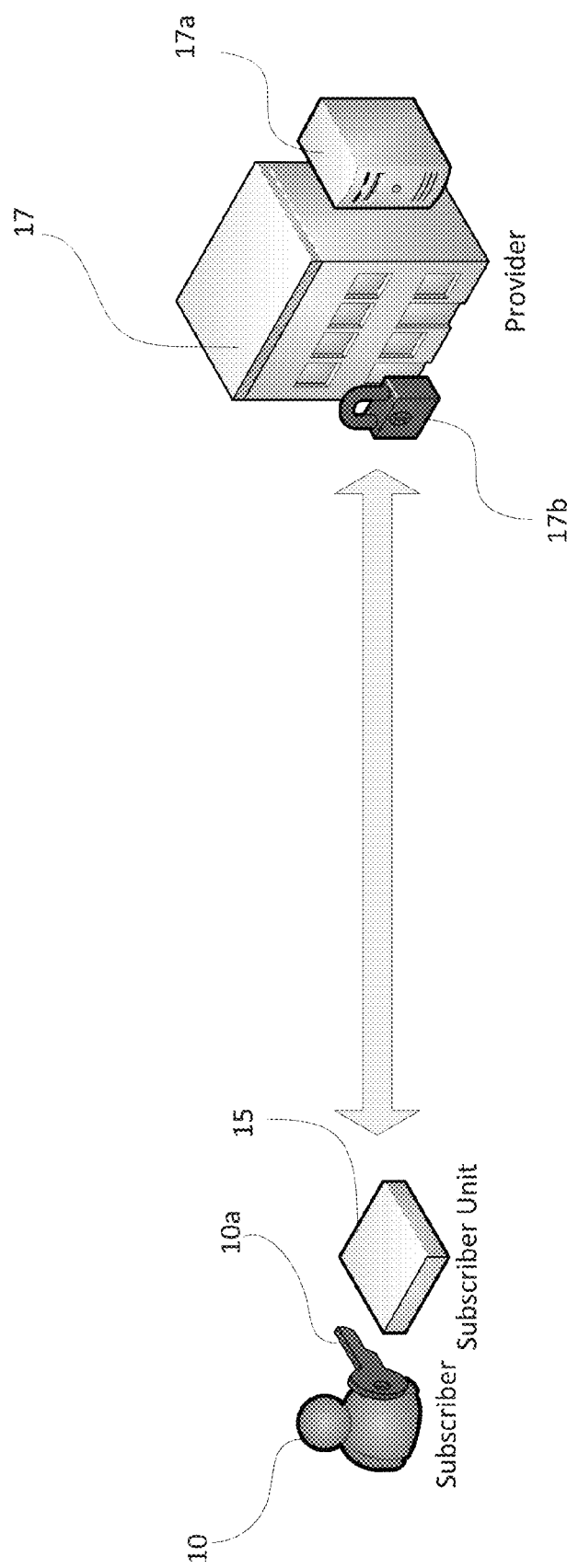
FIG. 1 shows a traditional setup of a subscriber on an authenticated login.

The present invention discloses and new method for securing confidential information during online transactions. FIG. 1 shows a traditional method of transaction between a subscriber 10 and a service provider 17. Under this method, a subscriber will use his subscriber unit 15 (i.e., a computer or smart phone) to log into the service provider's site to complete a transaction. There is no other party or entity involved in the transaction, and there is no added level of security between the transfers of information between the two. In FIG. 1, the login credentials associated with subscriber 10 (i.e., his username and password) are illustrated as 10a. The application server 17a is where the service provider 17 hosts an authenticating software application 17b, which verifies the subscriber's login credentials 10a.

Figure 2:
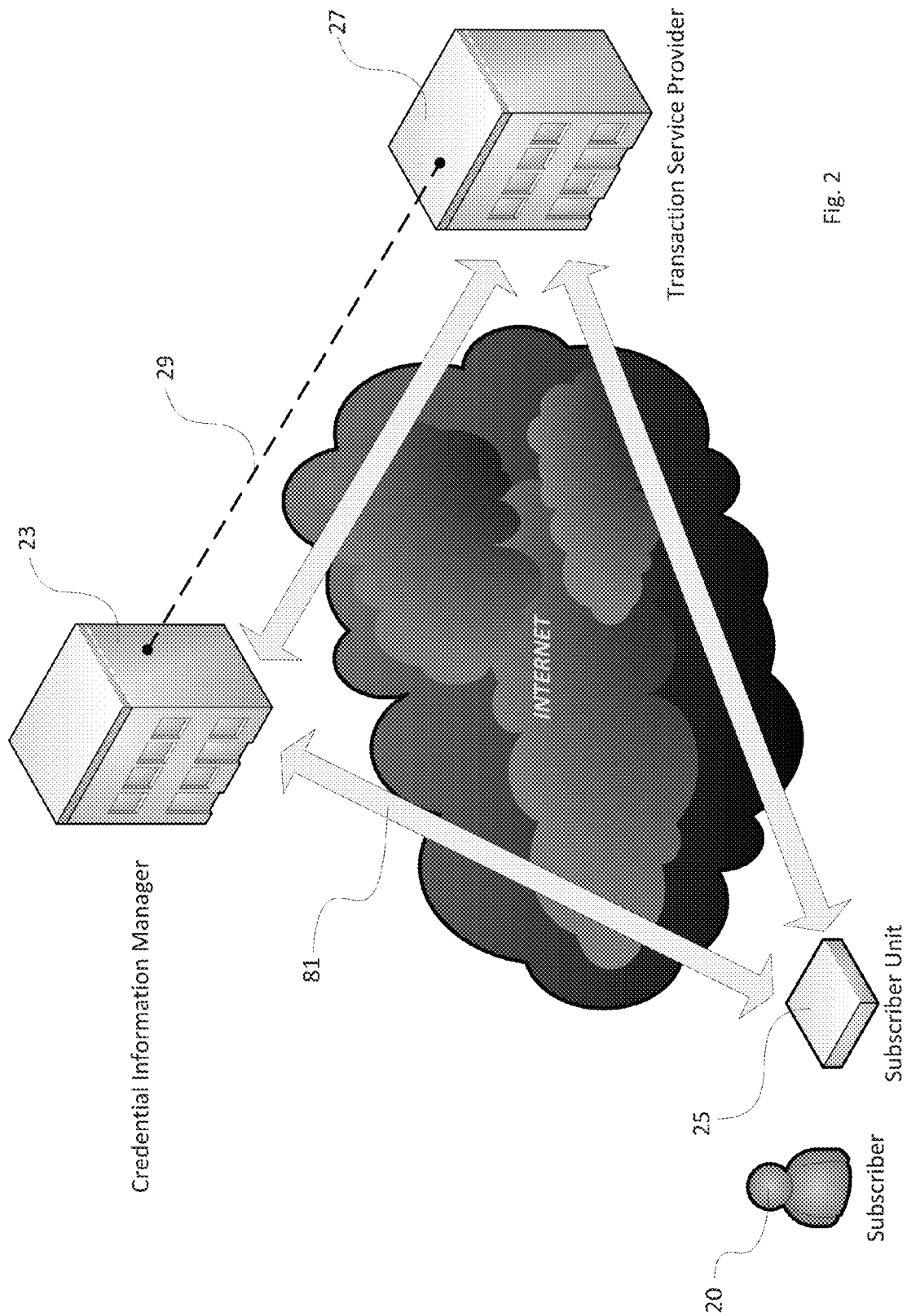
FIG. 2 shows the present invention, a method for securing confidential information in an online transaction using a credential information manager.

FIG. 2 shows the basic model of the present invention, denoted the "CyberID Technique." The present invention assigns a unique ID to a subscriber 20 on a network, such as the Internet or a Point of Sales Network, to distinguish that subscriber and the specific transaction involved. This allows the subscriber to have access to the services requested, while incorporating a secure transaction between an information manager and the Transaction Service Provider 27 (hereinafter "TSP") in order to share or exchange the subscriber's credential information. In this case, the credential information is the subscriber identification.

This invention presents the use of a Credential Information Manager 23 (hereinafter "CIM"), which acts as a middle-man between the subscriber of the service and the service provider. The CIM's role is to provide verification to both parties in the transaction that the other is who they say they are, as well as provide an additional layer of security to prevent hacking and theft of confidential information. The CIM will verify to the subscriber that the online account which he is attempting to access (or log in to) actually belongs to that service provider (rather than being fraudulent). At the same time, the CIM also certifies to the TSP that the person attempting to log in with the subscriber's credentials is actually the subscriber. This protects the subscriber from giving away personal information and login identification to a fake site, while at the same time protects the service provider from potential liability for granting access to a user's account to a hacker.

Figure 3:
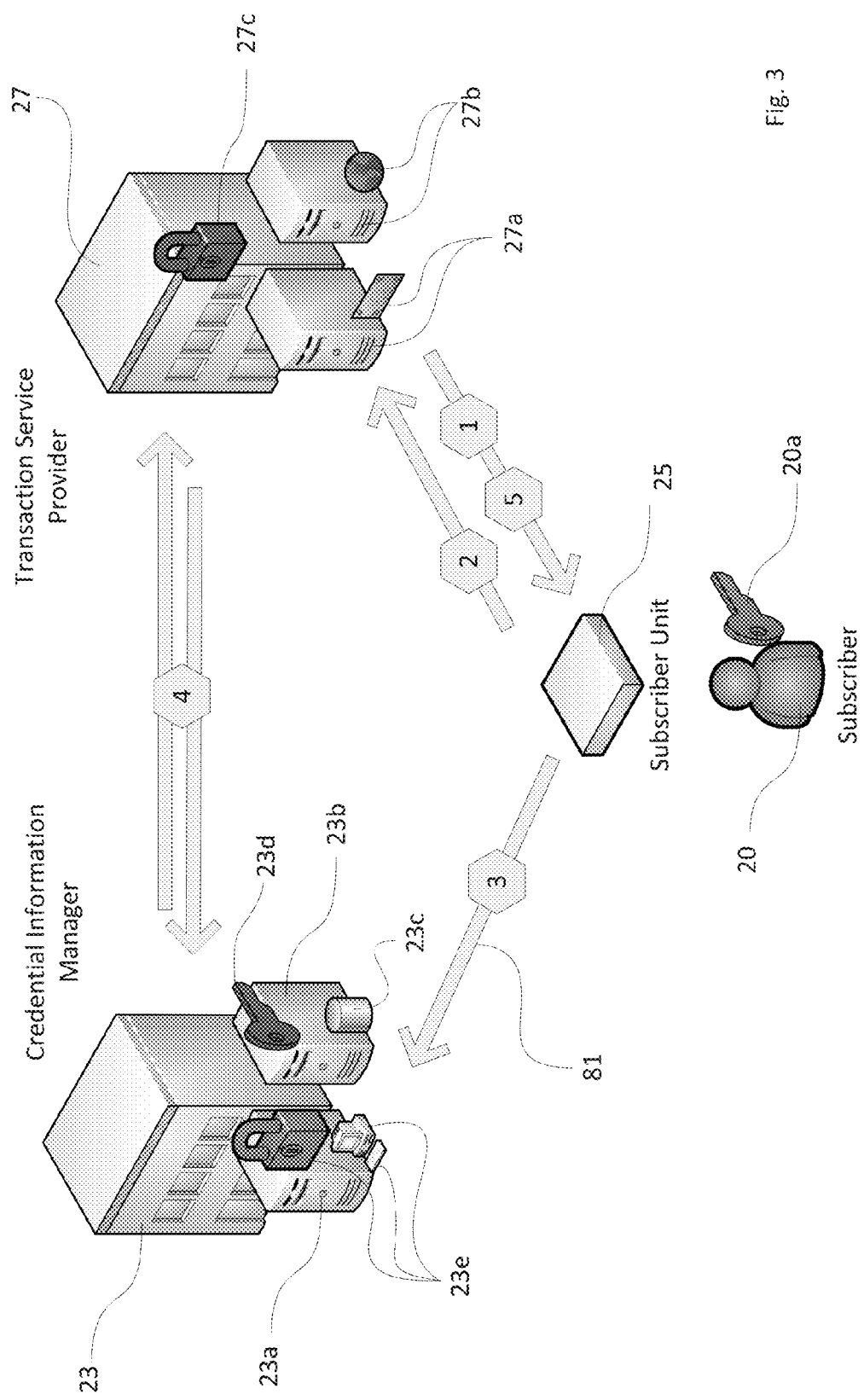
FIG. 3 shows the step-by-step method of using the CyberID.

FIG. 3 shows the step-by-step method of The CyberID technique, introducing the new component, a CIM, which acts as a proxy for the subscriber. When a subscriber attempts to log onto a service provider's site online, he will be instructed, via transmission 1, to enter the site or click on a link which signifies, via transaction 2, to the service provider that the subscriber is requesting to enter into a transaction. The TSP will then return a TID which represents the particular transaction to the CIM. The subscriber unit will send the TID and a subscriber ID (which is the equivalent of a username), via transmission 3, to the CIM for validation. Once the identity of both the subscriber and TSP are validated, the CIM will send, via transmission 4, the subscriber information and a CyberID to the TSP.

This process presents an added level of security for personal information that is not found in normal online login services, and is achieved because of a variety of factors. First, the CIM can ensure of the credibility of the service provider by negotiating an agreement with a TSP for all future transactions, thereby creating a link for the transfer of Transaction IDs and subscriber credential information. Second, the information sent to the service provider can be on a special link between the CIM and the TSP, such as a VPN, Internet, Intranet, PSTN, SMS, voice call, or even encrypted data. And third, even if the username and password information is lost by the TSP, a hacker still needs to get over the security barrier set up by the CIM to steal any confidential information.

In a traditional ID/Password method, where a subscriber keys into the TSP's web page, the password is generally the only secure element involved, whereas the ID is not. This creates the problem that a hacker who gains access to the TSP can also access any accounts connected to that TSP. In the present invention, the password is not the only secure element. A CyberID, sent from the CIM to the TSP, via transmission 4, to activate the transaction, is another protected element, which never crosses the subscriber's path. Thus, a hacker trying to access the subscriber's account will never see the CyberID or possibly ever even know of its existence.

In the present invention, the authentication between the subscriber and the CIM, known as the transaction ID, is one of the key factors. A transaction ID ("TID") differs from a password generally used in a transaction by a user because the TID only represents a single transaction, and is unique to each transaction. The other key factor is the CyberID, which can indicate the name of the user and any confidential information which the subscriber provides for verification of his identity. When the CIM passes the CyberID to the TSP, the TSP becomes aware of not only the subscriber involved, but the specific transaction which he is looking to complete.

In the case where there may be multiple CIMs, as discussed below, a method providing additional security would include delaying the transmission of the CyberID by the CIM until a TID transmitted by the SU can be verified as matching a TID The CIM will pass the credential information to the TSP, via transmission 4, which will then be alerted as to the identity of the subscriber. When the credential information is exchanged between an information manager and the service provider, the provider will use authenticated information provided by the subscriber to the TSP to automatically login the subscriber to its own online services. In some cases, the TSP can require the subscriber to key in a password to the subscriber unit (such as if the TSP is a Bank) which only the TSP is aware of. This use of a password is the same as in a generic ID/password system—the previous step of authentication by a CIM is one aspect of the present invention that distinguishes it from previous methods and systems. This extra step creates a secured transaction between the subscriber and TSP, saving the login credentials of the subscriber and making them free from hacking This is a different process from the procedure normally taken by a subscriber, who would input his own credentials for authentication and use of an online service. There, a hacker who is able to determine the password of a user, can input it and freely have access to that user's account. In the present invention, the hacker may be able to uncover a username, and maybe even a password, but he will not be able to overcome the security procedure set up such as the authenticating information required with the CIM, or the CyberID itself. In FIG. 3, the login credentials associated with subscriber 20 (i.e., his username and password) are illustrated as 20a. CIM application server 23a hosts a subscriber authenticating software application illustrated as 23e. CIM database server 23b handles and CIM database 23c stores, the subscribers' CyberIDs, which are illustrated as 23d. And FIG. 3 shows TSP application server 27a that hosts a CyberID authenticating software application 27c. TSP application server 27b hosts the services that are to be provided to the subscriber.

The method discussed in this disclosure uses a triangular relationship between the Subscriber, the Transaction Service Provider, and the Credential Information Manager to overcome security concerns that are common in online transactions. The communication technology between the CIM and the SU is a secure and authenticated communication channel, including, but not limited to, a VPN, audio or visual signalling, secure tunnelling, or any encrypted communication infrastructure or technology, such as a SIM card. The communication link 81 between the SU and the CIM is for a secure data transfer, where the CIM acts as a liaison for the subscriber and distributes the subscriber's confidential credential information to the TSP. Examples of a Subscriber Unit include a computer 25a (such as a notebook computer or tablet), a PDA, a smartphone 25b, and/or POS terminal 25d. These different examples can be seen in FIGS. 8-12, each showing the same triangular transaction, but utilizing different subscriber units.

In a preferred embodiment, for this process to be triggered, the subscriber is a member of a network 29 managing the transaction between the TSP and the CIM. Such management of the transaction occurs from a pre-arranged agreement between the TSP and a CIM, which distributes TIDs to the proper TSP for verification. With this pre-agreement between the CIM and the TSP in place, a subscriber may then enter into a transaction with the TSP.

Figure 4:
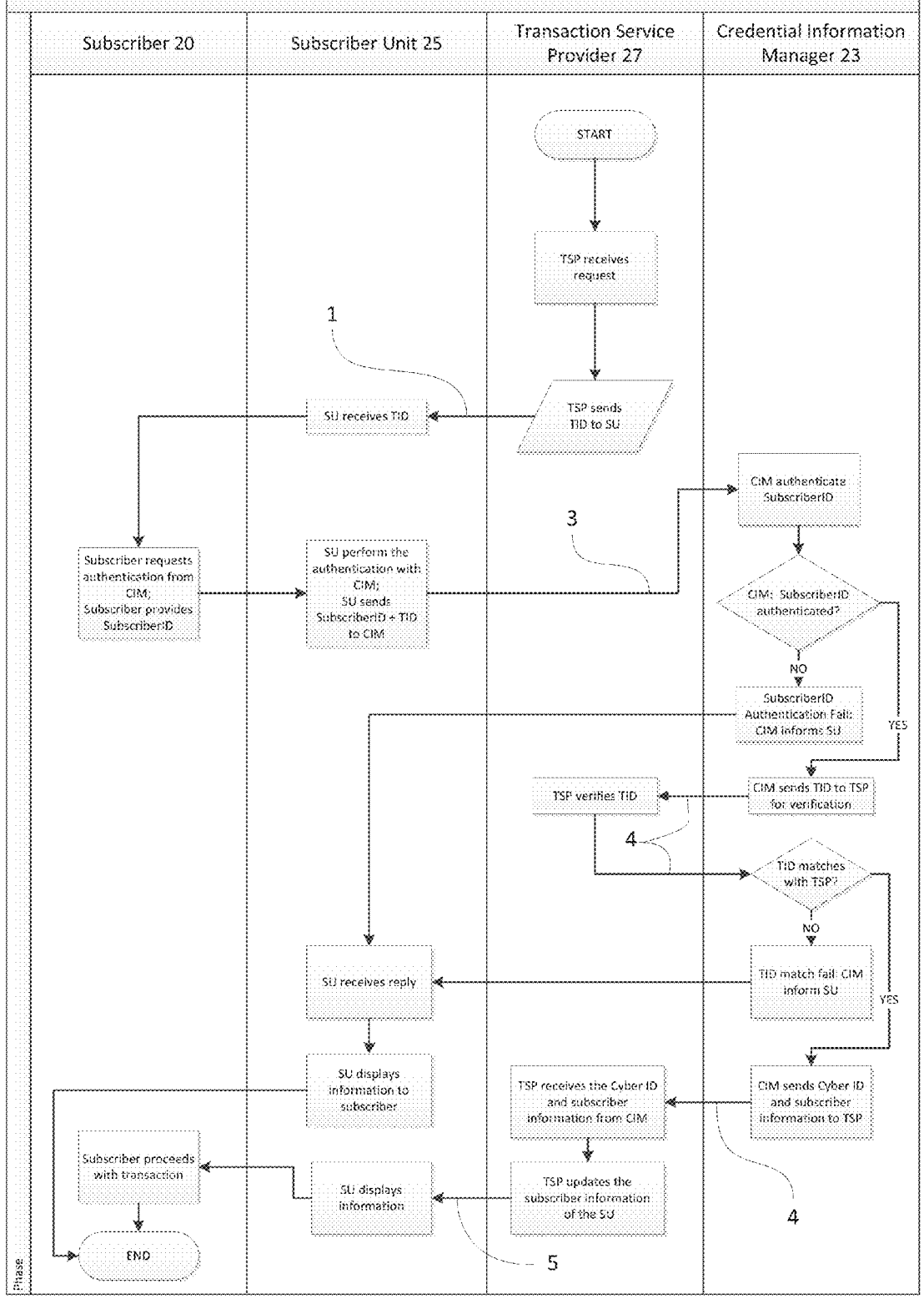
FIG. 4 shows a sequence diagram of the step-by-step process shown in FIG. 3 with the process beginning with the Transaction Service Provider.
Figure 5:
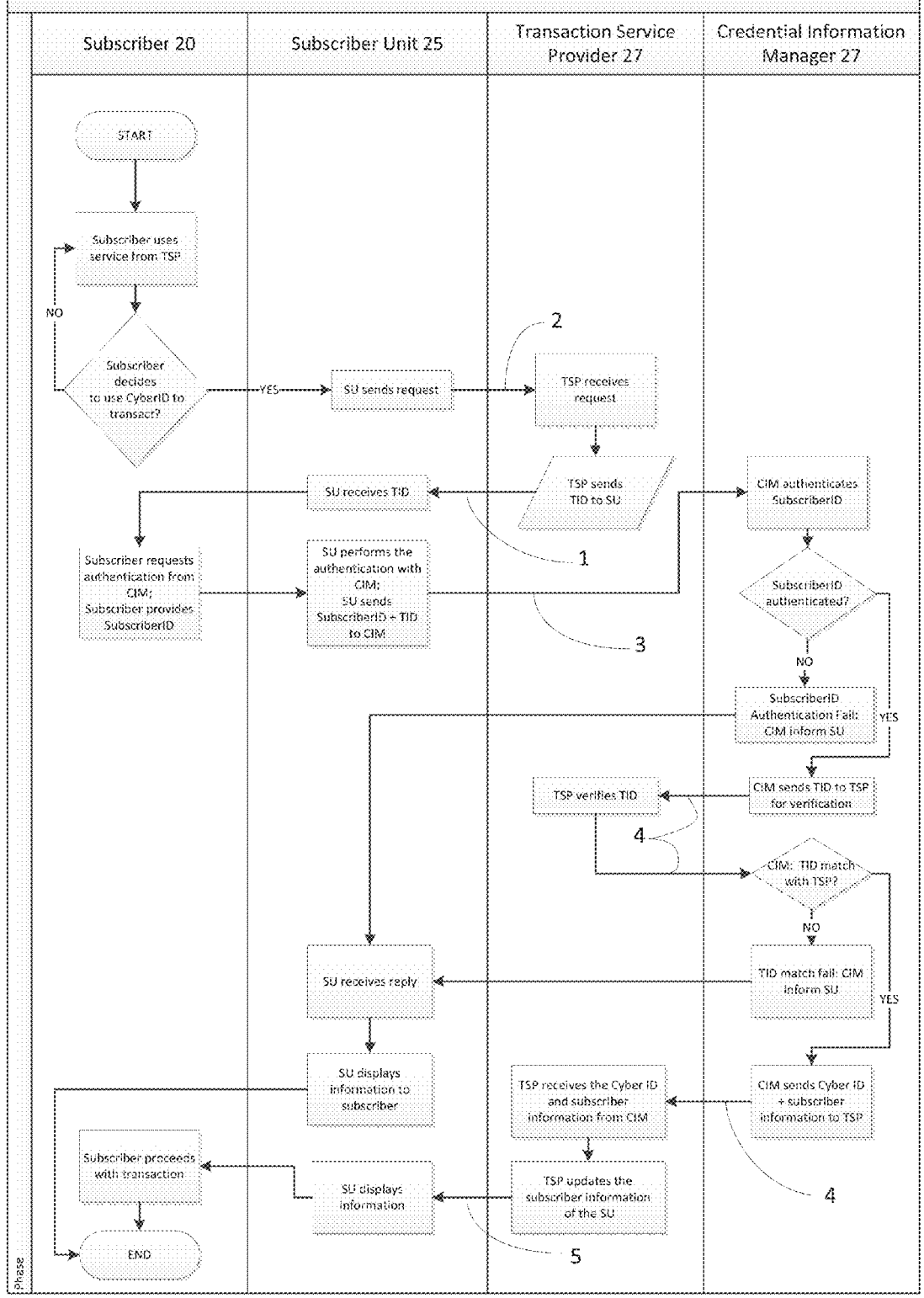
FIG. 5 shows an alternate version of FIG. 4 with the process beginning with the Subscriber.

FIGS. 4 and 5 disclose two separate flowcharts illustrating the steps which the present invention undergoes. FIG. 4 discloses the first step in the process starting with the TSP, while FIG. 5 discloses the first step in the process starting with the subscriber. As shown in FIG. 4, the TSP provides a session to the SU via transmission 1. On a triggered event by the SU (such as when the subscriber clicks on "pay," "join," "start," "member log-in," or other online services on a browser, application or other running services of the SU via transmission 2), the TSP responds by sending a TID to the SU. A subscriber requests authentication from the CIM via his SU. The authentication can be done by a method such as, for example, ID challenge, Password, or Voice call.

Authentication is done by the CIM who receives the TID and Subscriber ID via transmission 3 transmitted on a trusted (or secure) channel 81 between SU and CIM. In a preferred embodiment, a subscriber will need to be aware of the existence of a CIM connected to their network, such as via an app on a smart-phone or a website link on a computer, for the process to begin. In the situation that the trusted channel is uniquely set up for the Subscriber, it may not be necessary for the Subscriber ID to be sent over to the CIM. There are various ways for a trusted channel 81 to be set up, such as by a computer application that setup a VPN, a data-encrypted TID sent to the CIM, or a secure phone line, and secure links 82 (between the TSP and SU) and 83 (between the TSP and CIM) may be similarly constituted. The CIM will verify the TID with the TSP. After confirming that the TID (and thus also the TSP) is valid, the CIM sends a Cyber ID which represent the subscriber and some subscriber information (such as Name, Gender, birth date, address, and other information that the subscriber can use to verify itself), to the TSP. Upon receipt of this information, the TSP updates the subscriber information to the SU, via transmission 5, in a similar way that any internet webpage is updated. The Cyber ID may or may not be displayed on the SU. The subscriber then completes the transaction with the TSP.

Upon confirming credibility of both parties, the CIM will send subscriber information to the TSP, along with a CyberID. The information provided by the CIM to the TSP includes some information that subscriber can use to verify itself. Together with the Cyber ID, this represents the subscriber. The CyberID is similar in use to a username, but is provided by the CIM instead of the user, thereby diminishing the opportunity for the information to be hacked and stolen. If the subscriber is a member of the CIM's network, all transactions will go through the CIM to ensure safety and protection of the information. All parties (Subscriber, CIM and TSP) enjoy benefits from this CyberID system by avoiding the need for, and downfalls of, an ID and Password system.

Once the subscriber information has been acquired by the TSP, it will be displayed on the subscriber device when a subscriber attempts to use the online service. The subscriber can verify his own information with the information given previously to the CIM, and then confirm the transaction. Once the transaction is confirmed, the TSP may provide the CIM with updated details of the transaction.

Figure 6:
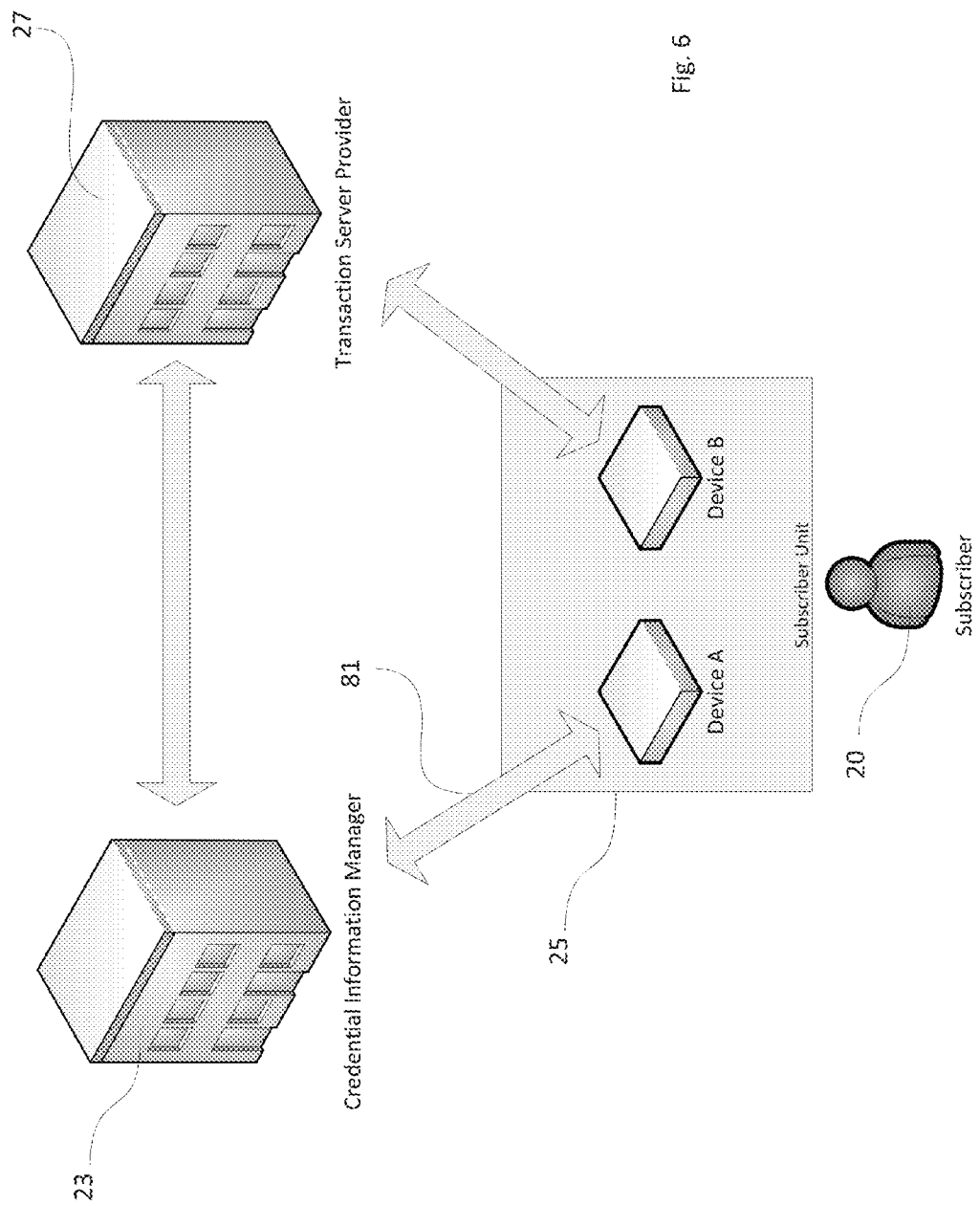
FIG. 6 shows the present invention with the subscriber unit made up of multiple units.
Figure 12:
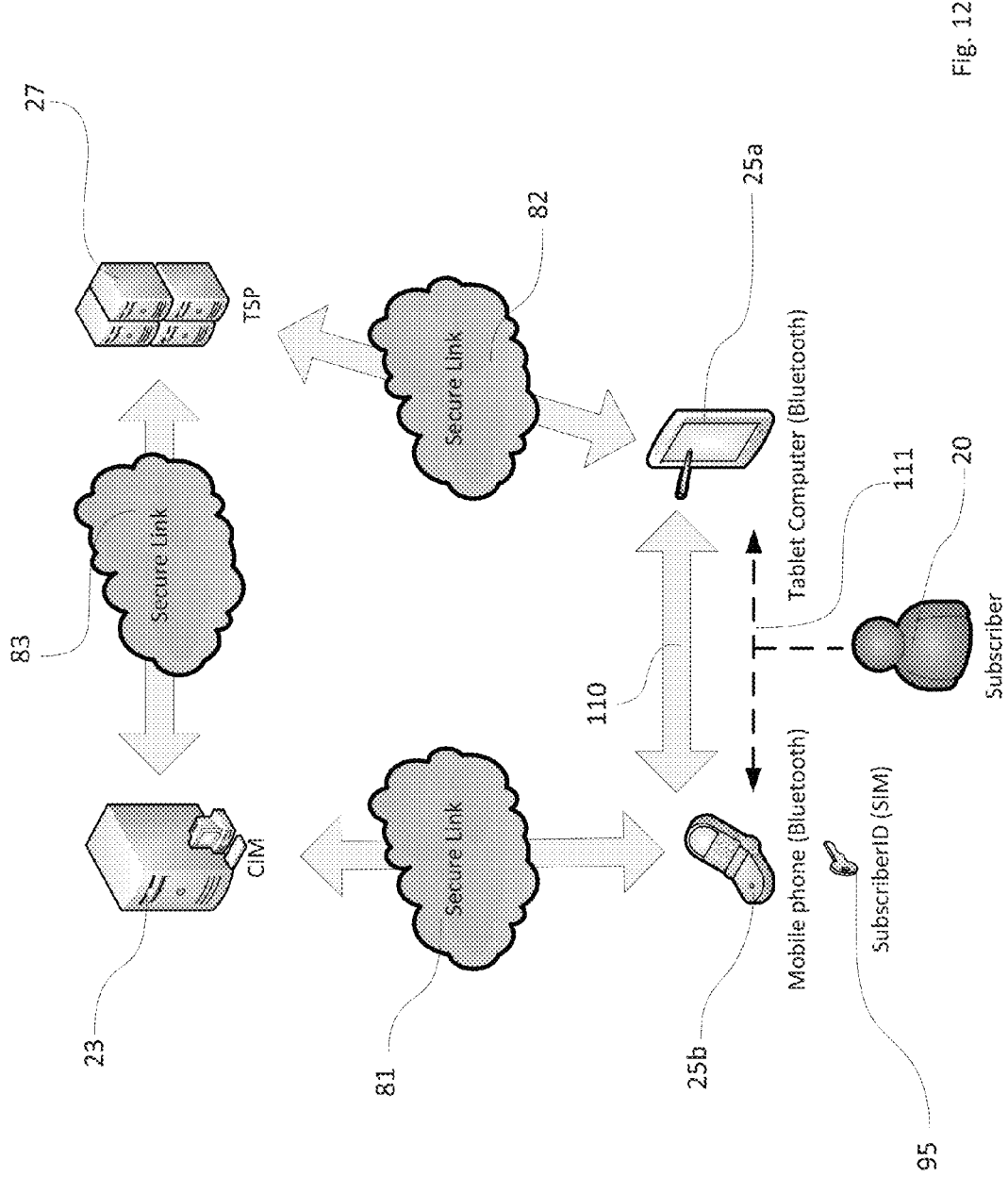
FIG. 12 shows an example of the present invention using a Mobile phone as the subscriber unit and a SIM card as the subscriber ID, and also using a Tablet Computer.

The Subscriber Unit can be one single unit with multiple software applications running on it, or a combination of two units or two or more hardware devices. In the case where the subscriber unit comprises a two device scenario, as shown in FIGS. 6 and 12, device A, which may be a mobile phone 25b, interfaces with the CIM 23 while device B interfaces with the TSP 27. An example of device "B" in this scenario is a Point of Sale ("POS") terminal 25c (such as a user-operated register or an ATM). The POS is capable of being part of the transaction network, but is not necessarily connected to the Internet. Passing on the TID between device A and B can be automatic via link 110 (via communication technology such as Wi-Fi, Bluetooth, and other communication protocol) or manual, where the subscriber directly transfers, via link 111, the information from Device B to Device A. As shown in FIG. 8-12, devices A and B can be any suitable communication device, including a phone (smart phone or general phone), PDA, notebook, PC, tablet, modem, fax machine, display/input terminal, and POS/ATM.

Figure 7:
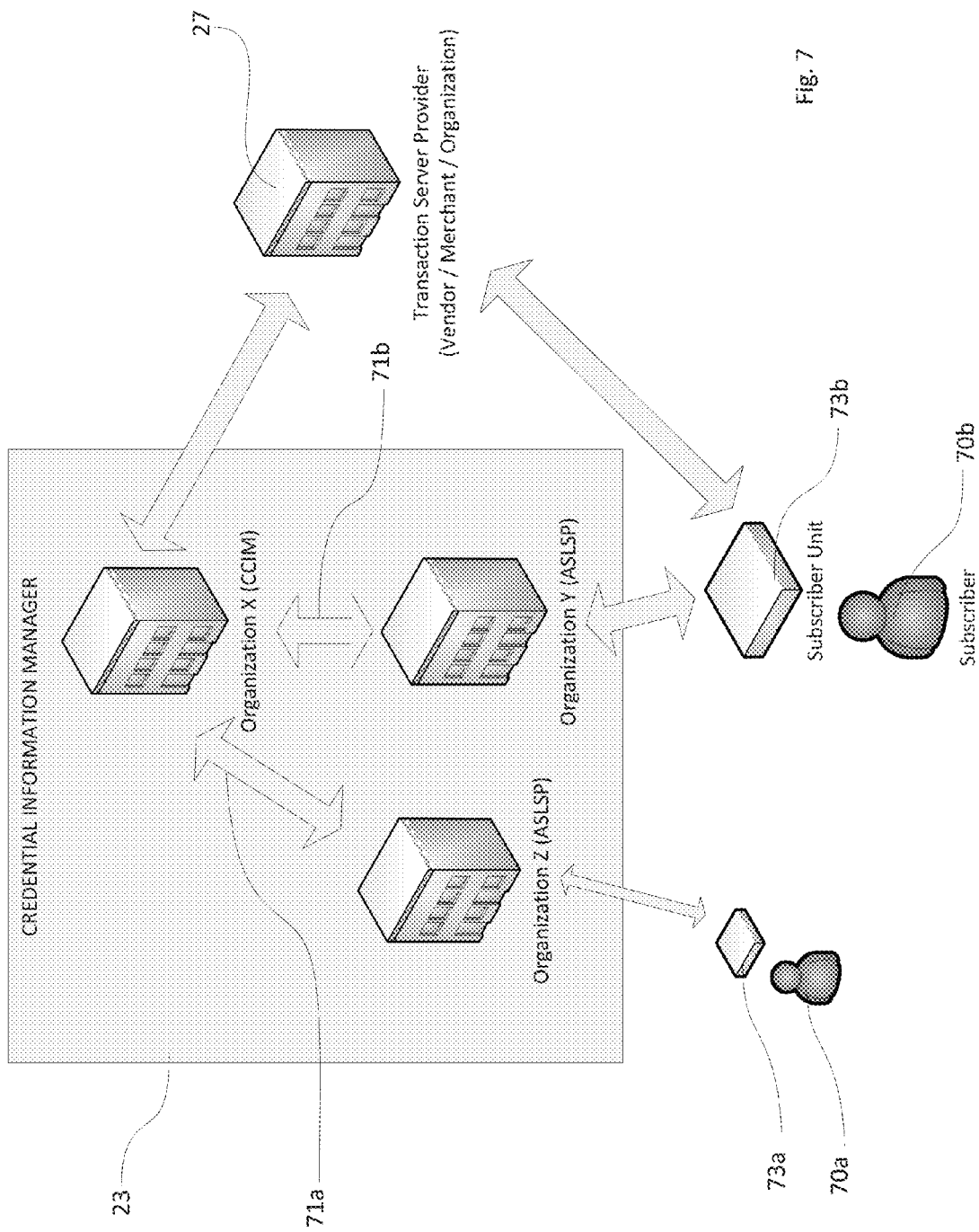
FIG. 7 shows the present invention with the CIM made up of multiple organizations.

Like the subscriber unit, the CIM may have a single identity or consist of multiple identities, as shown in FIG. 7. Organization X, which is a Certified CIM ("CCIM"), interfaces with the TSP as well as with Organizations Y and Z, which are called Authentication/Secure Link Service Providers ("ASLSPs"). These ASLSPs each have subscribers (i.e. subscriber 70a and SU 73a associated with Organization Z, and subscriber 70b and SU 73b associated with Organization Y) and can do authentication of their respective subscribers. In operation, the ASLSP passes the subscriber ID and TID to the CCIM, which interfaces with the TSP. A CCIM is a CIM that does not perform the subscriber authentication function, but the CCIM connects to TSP and performs the interface functions with the TSP. Communication channel 71a from Organization X to Organization Z and communication channel 71b from Organization Y to Organization Z are considered secured. Once a subscriber is authenticated by Organizations Y or Z, the subscriber ID plus the TID will pass to CCIM, and the remaining steps will be performed as described above.

In an example embodiment of this scenario, AT&T is an ASLSP having the role of Organization Y and Verizon is an ASLSP having the role of Organization Z, each have a pool of subscribers, such as mobile phone users. The role of the CCIM (Organization X) may be performed by another company, or may be one or more of Organizations Y or Z.

Organization X, the CCIM, connects to the TSP. Organizations X, Y and Z, they perform the function of CIM. It is possible for multiple companies performing role of Y and Z to connect to X. A company Y or Z can connect to multiple X.

Examples of Embodiments of the Invention

As an example of the implementation of the preferred embodiment, a subscriber uses a PC to go to the Amazon web site. While on the site, he decides to select a book and adds it to his cart. After he finishes the selection, the subscriber clicks "proceed to checkout." At this point, the present invention differs from a traditional online transaction by involving a CIM, whereas the traditional method allowed for only direct transfer of information between the SU and TSP. In this example, Amazon is the TSP and AT&T is the CIM.

After the subscriber clicks "proceed to checkout," Amazon returns a Transaction ID (TID) to the subscriber, and Amazon's web page would include, for example, a message saying "AT&T member click here." At this point, Amazon does not know who the subscriber is, but only knows that the subscriber is an AT&T member (assuming that the subscriber has clicked on this link to activate the CIM).

Figure 8:
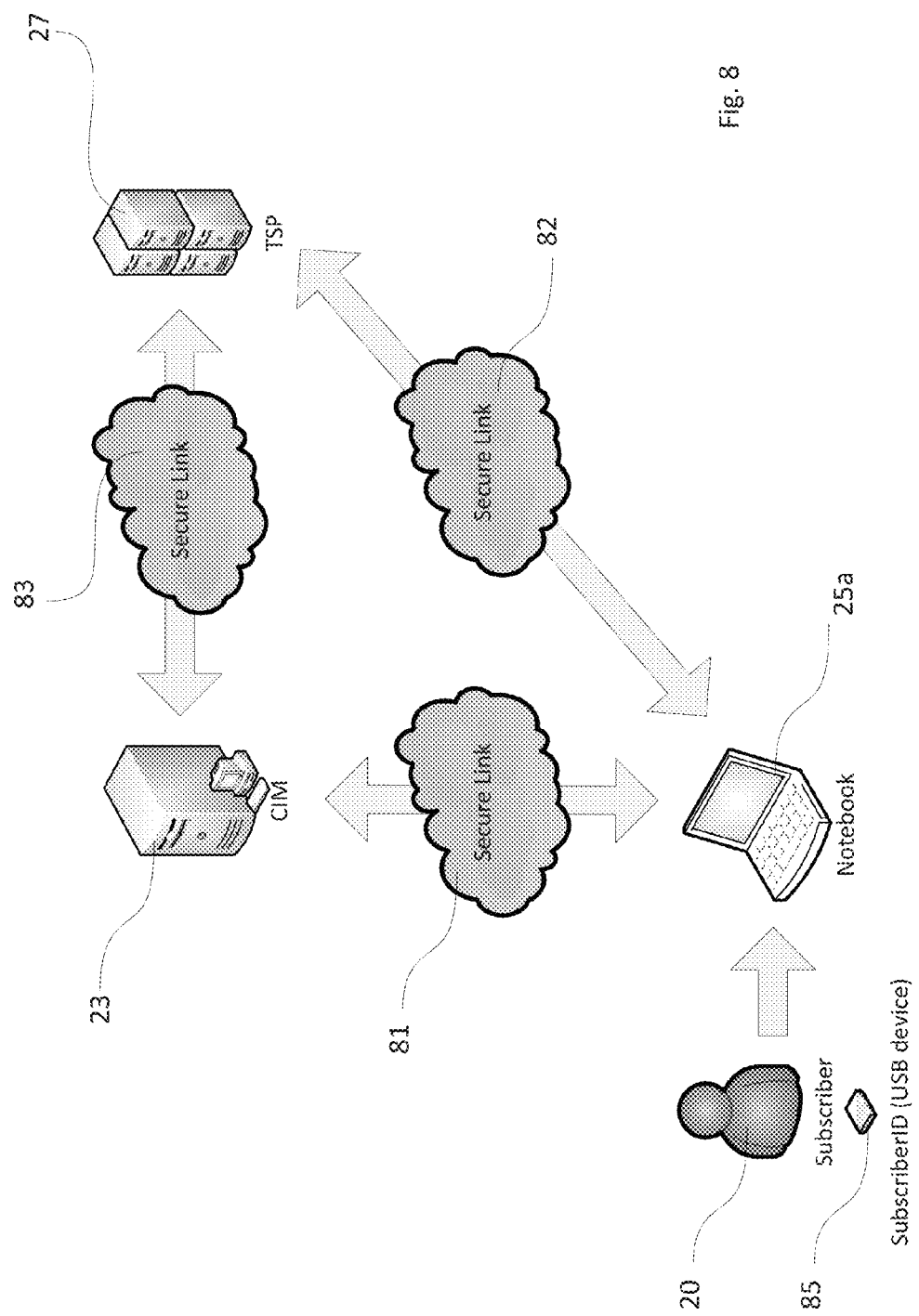
FIG. 8 shows an example of the present invention using a Notebook as the subscriber unit and a USB ID as the subscriber ID.
Figure 9:
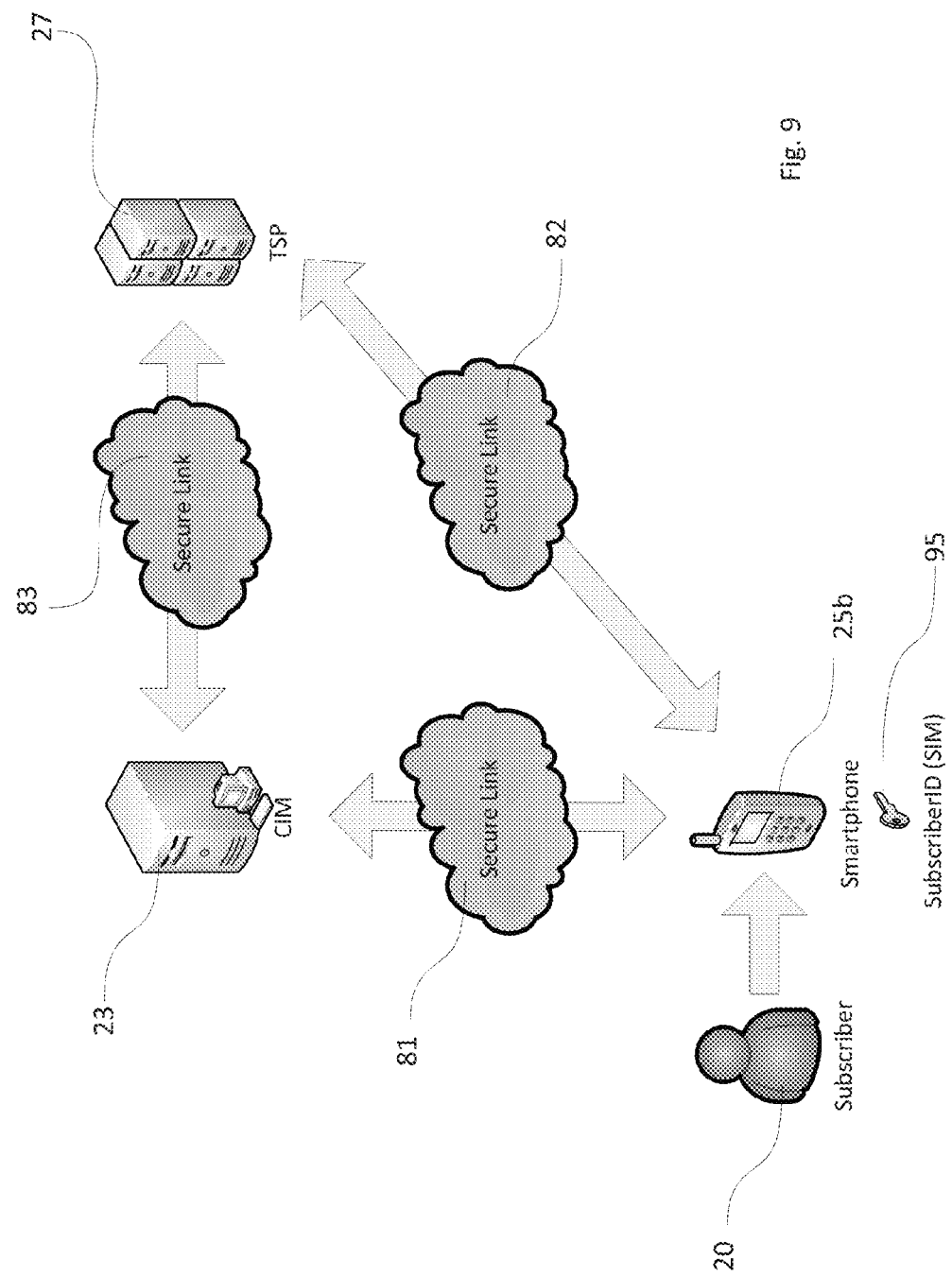
FIG. 9 shows an example of the present invention using a Smartphone as the subscriber unit and a SIM card as subscriber ID.

After the subscriber clicks the "AT&T member click here" button, other technologies may come in to play. The method of passing the TID to the CIM can be manual or automatic. In cases where the transaction is done on a smart phone with a SIM card 95 associated with the CIM (in this example, AT&T), software can be run in the background, pick up the TID, and send it immediately and directly to the CIM. This example, illustrated in FIG. 9, is one such automatic method. Alternatively, as illustrated in FIG. 8, there could be a token that carries the subscriber ID which connects to a USB port on a computer, which will automatically run in the background and then send the TID to the CIM. In the case of manual method, once the TID is shown on the display, the subscriber sends the verification to the CIM.

In this example, the subscriber unit, which stores the subscriber identity, will initialize an authentication communication with the CIM. Once authenticated, the subscriber unit passes the TID to the CIM. In this example, the CIM at this point knows the identification of the subscriber, knows that Amazon is the TSP.

In this example, AT&T verifies and confirms the existence of the TID with Amazon. Then AT&T sends the "Cyber ID" and some subscriber information, which may include a subscriber's name and some numeric characters, such as "Benjamin Fang 2001." At this point in the example, Amazon knows who the subscriber is by identifying the Cyber ID attached to the subscriber unit. Next, Amazon would display "Benjamin Fang 2001," after the subscriber clicks the "AT&T Member click here." The authentication procedure between the SU and CIM happens instantaneously and thus verifies both the CyberID and the TID by the time the subscriber connects to the aforementioned link. The subscriber may see the CyberID on the screen (where he would normally be required to put in a username), or other information that the subscriber can use to confirm that the account is correct, in this case "Benjamin Fang 2001," and can then verify that his own identity is correct.

For security protection of the subscriber's identity, the account identification (such as "Benjamin Fang 2001") will be designed to let the subscriber decide what to use and can be changed over time. The CIM issues a unique CyberID that representing the CIM's subscriber to a TSP. In some cases, the CyberID issued to a specific TSP may always be fixed for the CIM's subscriber. For example, when the CyberID is used as subscriber account identity to the TSP, the CyberID will remain fixed for the CIM's subscriber. However, even if the CyberID is fixed for a certain TSP, different TSPs can get different CyberID for the same subscriber to a CIM. This CyberID technique gives an advantage to the CIM's subscriber, who may stay anonymous to the TSP, but for enforcement requirements, may still be able to trace to the subscriber identity via the CIM.

As an example of internet banking on a smartphone, using the situation above where AT&T is the CIM, a subscriber (who owns a bank account) wants to do online banking using a smartphone. The subscriber uses the browser (or application) running on the smartphone and browses the bank's site or downloaded app. The bank is the TSP. After the subscriber clicks the "AT&T member click here" link (the same link as in the previous example), the bank will provide a TID to the user's smartphone. Another application on the phone (which the subscriber will have been prompted to download the first time he uses this online service on his smart phone) will start the authentication process with the CIM using the SIM card 95 on the smartphone. A SIM card is unique to the subscriber. After successful authentication, the application sets up a secure channel from smartphone to the CIM, which allows for safe passage of the TID from the smartphone to the CIM.

After the CIM successfully verifies the TID with the bank, through the same pre-agreement as described above, the CIM passes the Cyber ID and the subscriber's credential information to the bank. At this point the bank knows the identity of the subscriber that received the TID. When this occurs, the bank will update its web page on the subscriber's smartphone and display the subscriber's name on the page. Then, the bank simply requests a password from the subscriber. This method of getting the TSP to show the subscriber's account is also applicable for when the TSP is an organization such as enterprise, school, union, or any other of which the subscriber is a member of the organization.

Figure 10:
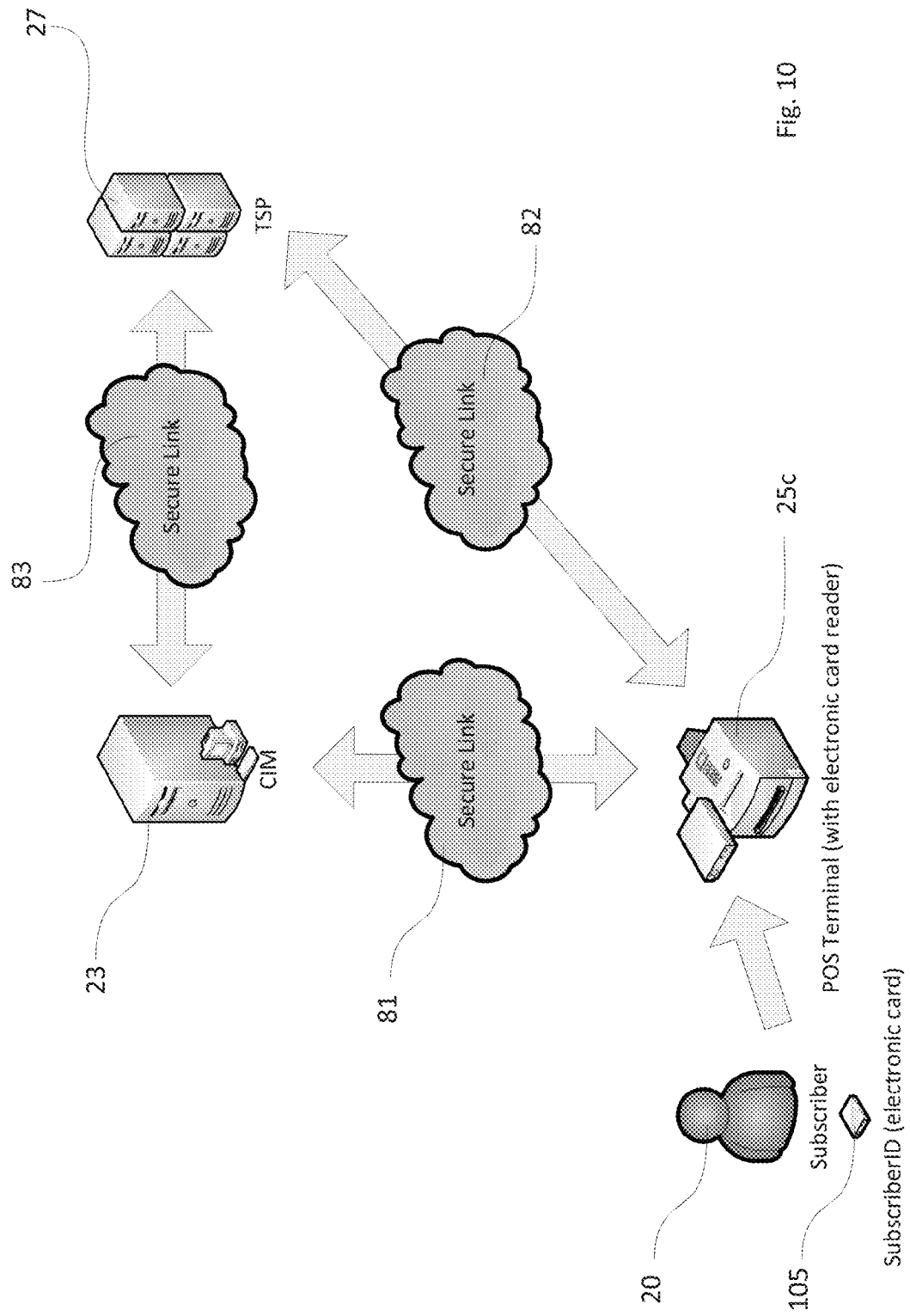
FIG. 10 shows an example of the present invention using a Point of Sales Terminal as the subscriber unit and an electronic card reader as subscriber ID.
Figure 11:
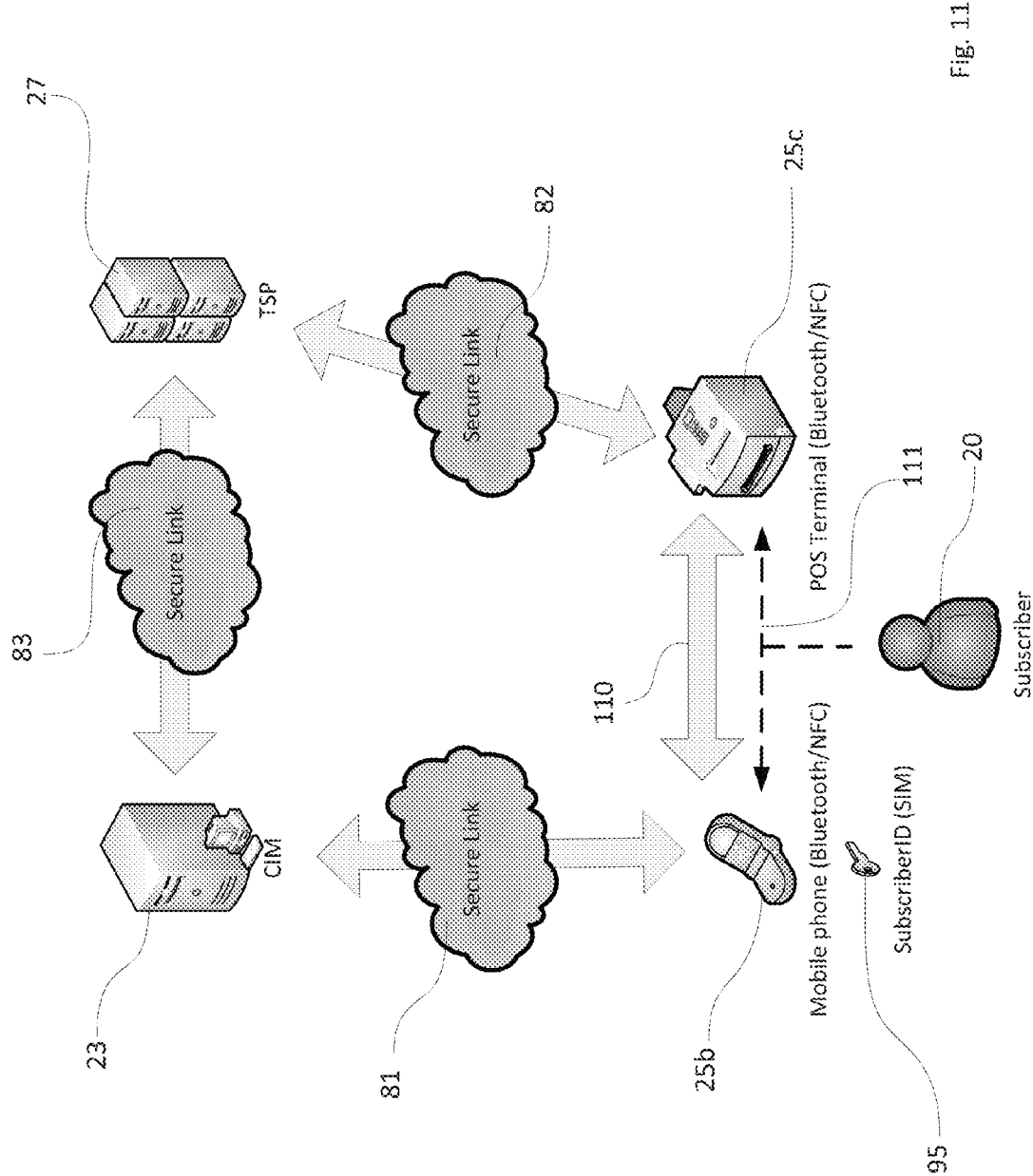
FIG. 11 shows an example of the present invention using a Mobile phone as the subscriber unit and a SIM card as the subscriber ID, and also using a Point of Sales Terminal w/out card reader.

As an alternative example 25c of an application using a Point of Sale Terminal, illustrated in FIG. 10, the subscriber comes to a point of sale terminal, such as a shopping mall cash register or vending machine, and decides to use the Cyber ID method to do the transaction. The subscriber will inform the counter that he is an AT&T member. The point of sales terminal will generate a TID. If the point of sales counter has an ID reader, then that allows the subscriber to do the authentication with the CIM. The subscriber will tap or insert an electronic subscriber ID card 105 (provided by the CIM, in this case AT&T) at the ID reader and authenticate with the CIM. Alternatively, the subscriber can use his AT&T mobile phone, send a text message or use an application on the mobile phone to send the TID to the CIM. The authentication is done by using the SIM card on the mobile phone.

After the CIM successfully authenticates the subscriber and gets the TID, the CIM will verify the TID with the TSP. After verification, the CIM will send the Cyber ID and the subscriber credential information (such as credit card information) to the TSP. The TSP will then update the POS terminal with the subscriber credential information (in this case, the credit card information) and the subscriber can complete the transaction.

This triangular process does not have to be sequential, as is shown in FIGS. 3-5. Instead, the authentication between the Subscriber and the CIM can be done in different sequence in different situation. For example, if the SU is a Mobile Phone, the authentication is always done once the mobile phone is connected to a network. However, when done in sequential order, a subscriber clicks on a TSP web page, and then the TSP will send a TID to a subscriber unit.

While the method and system of the present invention has been described with reference to various embodiments, those skilled in the art will understand that various changes may be made and equivalents may be substituted for the disclosed elements without departing from the scope and essence of the disclosed invention. Additionally, many modifications may be made to adapt a particular situation or structure to the teachings of the disclosure without departing from its essential scope. Accordingly, the invention is not limited to the particular embodiments disclosed, but rather includes all embodiments falling within the scope of the appended claims.

The invention claimed is:

1. A method for securing a transaction by a user comprising:
providing a subscriber unit having a processor, a memory, and a display,
wherein said subscriber unit is configured to accept user input,
providing a credential information manager having a processor and a memory,
storing a cyber identifier associated with the user in said credential information manager memory, wherein said cyber identifier comprises a username and subscriber information;
storing a subscriber identifier associated with the user in said credential information manager memory;
storing said subscriber information associated with the user in said credential information manager memory;
providing a transaction service provider having a processor and a memory,
transmitting a request for a transaction from said subscriber unit to said transaction service provider;
transmitting a transaction identifier, created by said transaction service provider based on said transaction request, from said transaction service provider to said subscriber unit;
storing said transaction identifier in said transaction service provider memory;
transmitting a request for authentication from said subscriber unit to said credential information manager;
transmitting said transaction identifier from said subscriber unit to said credential information manager;
transmitting a subscriber identifier from said subscriber unit to said credential information manager;
authenticating, by said credential information manager, said subscriber identifier received by said credential information manager from said subscriber unit with said subscriber identifier stored in said credential information manager memory;
transmitting a request for verification from said credential information manager to said transaction service provider;
transmitting, from said credential information manager to said transaction service provider, said transaction identifier received from said subscriber unit;
verifying, by transaction service provider, said transaction identifier received by transaction service provider from said credential information manager with said transaction identifier stored in said transaction service provider memory;
transmitting, from said transaction service provider to said credential information manager, a verification request result message;
transmitting, from said credential information manager to said transaction service provider, said cyber identifier stored in said credential information manager memory;
transmitting, from said credential information manager to said transaction service provider, said subscriber information stored in said credential information manager memory;
transmitting a transaction authorization from said credential information manager to said transaction service provider; and
transmitting a password from said subscriber unit to said transaction service provider;
wherein said password is never transmitted to said credential information manager and wherein said cyber identifier is never transmitted to said subscriber unit; and
wherein said subscriber information is never transmitted to said transaction service provider by said subscriber unit.

2. The method of claim 1 wherein said authentication further includes comparing, by said credential information manager processor, said subscriber identifier received by said credential information manager from said subscriber unit with said subscriber identifier stored in said credential information manager memory.

3. The method of claim 2 wherein said verification request is sent as a result of said comparison indicating that said subscriber identifier received by said credential information manager from said subscriber unit matches said subscriber identifier stored in said credential information manager memory.

4. The method of claim 2 further including transmitting an authentication failure message from said credential information manager to said subscriber unit, wherein said authentication failure message is sent as a result of said comparison indicating that said subscriber identifier received by said credential information manager from said subscriber unit does not match said subscriber identifier stored in said credential information manager memory.

5. The method of claim 4 further including displaying a visual authentication failure message on said subscriber unit display based on said authentication failure message transmitted from said credential information manager to said subscriber unit.

6. The method of claim 1 wherein said verification further includes comparing, by said transaction service provider processor, said transaction identifier received by transaction service provider from said credential information manager with said transaction identifier stored in said transaction service provider memory, wherein said verification result request message includes a result of said comparison.

7. The method of claim 6 wherein said transmission of said cyber identifier is sent as a result of said verification result request message indicating that said transaction identifier received by said transaction service provider from said credential information manager matches with said transaction identifier stored in said transaction service provider memory.

8. The method of claim 6 further including transmitting a verification failure message from said credential information manager to said subscriber unit, wherein said verification failure message is sent as a result of said verification result request message indicating that said transaction identifier received by said transaction service provider from said credential information manager does not match with said transaction identifier stored in said transaction service provider memory.

9. The method of claim 8 further including displaying a visual verification failure message on said subscriber unit display based on said verification failure message transmitted from said credential information manager to said subscriber unit.

10. The method of claim 1 wherein said subscriber unit is made up of one or more mobile phones, smart phones, PDAs, computers, or POS terminals, modems, fax machines, or display/input terminals.

11. The method of claim 10 wherein said subscriber unit is made of a phone in wireless communication with a POS terminal.

12. The method of claim 1 where one or more of the transmissions are made via a secure telecommunications link.

13. The method of claim 1 where one or more of the transmissions are made via a wireless telecommunications link.

14. The method of claim 1 where one or more of the transmissions are made via the internet.

15. The method of claim 12 wherein said secure telecommunications link includes one or more of a VPN, audio or visual signaling, secure tunneling, or an encrypted communication infrastructure.

16. The method of claim 1 wherein, before said subscriber identifier is transmitted from said subscriber unit to said credential information manager, said subscriber identifier is received as input to the subscriber unit and stored in said subscriber unit memory.

17. The method of claim 1 wherein said subscriber unit memory includes a removable memory, and before said subscriber identifier is transmitted from said subscriber unit to said credential information manager, said subscriber identifier is stored in said subscriber unit memory.

18. The method of claim 17 wherein said removable memory includes a SIM card.

19. The method of claim 17 wherein said removable memory includes an electronic card.

20. The method of claim 1 further including storing said subscriber information, transmitted from said credential information manager to said transaction service provider, in said transaction service provider memory.

21. The method of claim 1 further including transmitting said subscriber information, transmitted from said credential information manager to said transaction service provider, from said transaction service provider to said subscriber unit.

22. The method of claim 21 further including displaying visual subscriber information on said subscriber unit display based on said subscriber information transmitted from said transaction service provider to said subscriber unit.

23. The method of claim 1, further comprising verifying, by said transaction service provider, said password transmitted from said subscriber unit.

24. A system for securing a transaction by a user comprising:
a subscriber unit having a processor, a memory, and a display,
wherein said subscriber unit is configured to accept user input,
a credential information manager having a processor and a memory,
a cyber identifier associated with the user stored in said credential information manager memory, wherein said cyber identifier comprises a username and subscriber information;
a subscriber identifier associated with the user stored in said credential information manager memory;
said subscriber information associated with the user stored in said credential information manager memory;
a transaction service provider having a processor and a memory,
a transaction request configured to be transmitted by a communication path from said subscriber unit to said transaction service provider;
a computer program stored in said memory of said transaction service provider for creating, based on said transaction request, a transaction identifier;
said transaction identifier configured to be transmitted by a communication path from said transaction service provider to said subscriber unit;
said transaction identifier stored in said transaction service provider memory;
a request for authentication configured to be transmitted by a communication path from said subscriber unit to said credential information manager;
said transaction identifier configured to be transmitted by a communication path from said subscriber unit to said credential information manager;
a subscriber identifier configured to be transmitted by a communication path from said subscriber unit to said credential information manager;
a computer program stored in said memory of said credential information manager for authenticating, by said credential information manager, said subscriber identifier received by said credential information manager from said subscriber unit with said subscriber identifier stored in said credential information manager memory;
a request for verification configured to be transmitted by a communication path from said credential information manager to said transaction service provider;
said transaction identifier, received from said subscriber unit, configured to be transmitted by a communication path from said credential information manager to said transaction service provider;
a computer program stored in said memory of said transaction service provider for verifying, by transaction service provider, said transaction identifier received by transaction service provider from said credential information manager with said transaction identifier stored in said transaction service provider memory;
a verification request result message configured to be transmitted by a communication path from said transaction service provider to said credential information manager;
said cyber identifier, stored in said credential information manager memory, configured to be transmitted by a communication path from said credential information manager to said transaction service provider;
said subscriber information, stored in said credential information manager memory, configured to be transmitted by a communication path from said credential information manager to said transaction service provider;
a transaction authorization configured to be transmitted by a communication path from said credential information manager to said transaction service provider; and a password configured to be transmitted by a communication path from said subscriber unit to said transaction service provider;

wherein said password is never transmitted to said credential information manager and wherein said cyber identifier is never transmitted to said subscriber unit; and wherein said subscriber information is never transmitted to said transaction service provider by said subscriber unit.

25. The system of claim 24 wherein said subscriber unit is made up of one or more mobile phones, smart phones, PDAs, computers, or POS terminals, modems, fax machines, or display/input terminals.

26. The system of claim 25 wherein said subscriber unit is made of a phone in wireless communication with a POS terminal.

27. The system of claim 24 where one or more of the communication paths include a secure telecommunications link.

28. The system of claim 24 where one or more of the communication paths include a wireless telecommunications link.

29. The system of claim 24 where one or more of the communication paths include the internet.

30. The system of claim 27 wherein said secure telecommunications link includes one or more of a VPN, audio or visual signaling, secure tunneling, or an encrypted communication infrastructure.

31. The system of claim 24 wherein said subscriber unit memory includes a removable memory, and before said subscriber identifier is transmitted from said subscriber unit to said credential information manager, said subscriber identifier is stored in said subscriber unit memory.

32. The system of claim 31 wherein said removable memory includes a SIM card.

33. The system of claim 31 wherein said removable memory includes an electronic card.

34. The system of claim 24 wherein said credential information manager further includes:

a certified credential information manager having a processor and a memory, an authentication/secure link service provider having a processor and a memory, said authentication request, received from said subscriber unit by said credential information manager, configured to be transmitted by a communication path from said certified credential information manager to said authentication/secure link service provider, said subscriber identifier, received from said subscriber unit by said credential information manager, configured to be transmitted by a communication path from said certified credential information manager to said authentication/secure link service provider, wherein said authentication computer program is stored in said authentication/secure link service provider memory, and wherein said subscriber identifier stored in said credential information manager memory is stored in said authentication/secure link service provider memory.

35. The system of claim 24, wherein said transaction service provider is configured to verify said password transmitted from said subscriber unit.

* * * * *